(12) United States Patent
Doumbos

(10) Patent No.: US 10,989,106 B2
(45) Date of Patent: Apr. 27, 2021

(54) OIL PRESSURE REGULATOR

(71) Applicant: TURBOSMART PTY LIMITED, Wetherill Park (AU)

(72) Inventor: Christopher Doumbos, Penshurst (AU)

(73) Assignee: TURBOSMART PTY LIMITED, Wetherill Park (AU)

( * ) Notice: Subject to any disclaimer, the term of this patent is extended or adjusted under 35 U.S.C. 154(b) by 302 days.

(21) Appl. No.: 15/367,627

(22) Filed: Dec. 2, 2016

(65) Prior Publication Data

US 2018/0156106 A1 Jun. 7, 2018

(51) Int. Cl.
*F02B 39/14* (2006.01)
*F02B 37/00* (2006.01)

(52) U.S. Cl.
CPC .............. *F02B 39/14* (2013.01); *F02B 37/00* (2013.01); *Y02T 10/12* (2013.01)

(58) Field of Classification Search
CPC . F01D 25/20; F02B 39/14; F01M 2001/1092; F04D 15/0011; F01L 1/462; F01L 2009/0444; F16K 15/025; F16L 37/50; F25B 2700/2101
USPC ..................................... 137/115.01; 60/605.3
See application file for complete search history.

(56) References Cited

U.S. PATENT DOCUMENTS

| | | | | |
|---|---|---|---|---|
| 2,884,952 A | * | 5/1959 | Mason | F16K 17/0433 137/494 |
| 3,045,419 A | * | 7/1962 | Addie | F01M 1/02 60/605.3 |
| 3,045,420 A | * | 7/1962 | Addie | F01M 1/02 123/41.15 |
| 3,057,436 A | * | 10/1962 | Jacobson | F01D 25/20 123/196 A |
| 4,796,661 A | * | 1/1989 | Hishinuma | G05D 16/2093 137/487.5 |
| 6,938,873 B2 | * | 9/2005 | Fischer | F01L 1/267 251/30.01 |
| 2010/0213010 A1 | * | 8/2010 | Cornet | F01D 25/20 184/6.11 |

* cited by examiner

Primary Examiner — Audrey K Bradley
Assistant Examiner — Edward Bushard
(74) Attorney, Agent, or Firm — Polsinelli PC

(57) ABSTRACT

A turbocharger lubricating oil pressure regulator (10) having a lubricating oil inlet port (12) adapted to receive turbocharger lubricating oil and an outlet port (13) in fluid communication with the lubricating oil inlet port (12). The regulator (10) has a lubricating oil bypass port (14) in fluid communication with the oil inlet port (12) at one end and in fluid communication with a lubricating oil sump (3) at another. A valve (17) is biased in a closed configuration to block oil flow between the lubricating oil inlet port (12) and the bypass port (14) and movable toward an open configuration in response to a predetermined lubricating oil pressure at the inlet port (12) allowing lubricating oil to flow through the bypass port (14) to the oil sump (3).

6 Claims, 4 Drawing Sheets

OIL PRESSURE REGULATOR

FIELD OF THE INVENTION

The present invention relates to internal combustion engine turbocharger systems and, in particular, to a turbocharger lubrication oil pressure regulator.

The invention has been developed for use with land vehicle internal combustion engines and will be described hereinafter with reference to this application. However, it will be appreciated that the invention is not so limited and it applicable to stationary plant engines and marine engines employing turbochargers, for example.

BACKGROUND ART

In an internal combustion engine, a turbocharger is a very well-known device for utilising the energy of the engine exhaust gases to compress engine intake air to more efficiently combust fuel, whether petrol or diesel internal combustion engines.

Typically, turbochargers have a pair of impeller blades mounted at opposing ends of a common shaft. Each impeller rotates within its own domain in a housing of the turbocharger. The drive impeller of the turbocharger functions as a generator where the exhaust gas enters the housing and the energy from the exhaust is converted to rotational energy of the shaft. This correspondingly rotates the air intake impeller on the common shaft resulting in air being drawn in and compressed to a higher energy state, providing a higher volumetric efficiency for the engine.

It is typical for turbocharger devices to include an oil feed line linking on to an inlet of the centre housing rotating assembly (CHRA), thereby feeding the bearings or otherwise lubricating the common shaft. Typically, the lubricating oil is supplied to the oil inlet at the turbocharger from an existing oil port on the internal combustion engine oil pump. The oil pump is designed to maintain predetermined pressure to properly support the internal combustion engine operations safely, such as maintaining crankshaft concentricity.

It is well known to cool the engine lubricating oil generally in an oil radiator which is a similar heat exchanger to a conventional vehicle air-cooled radiator. This can be important to prevent negative consequences that arise from over-heating the lubricating oil such as coking. Also, the air compressed by the turbocharger is often cooled by an intercooler or the like prior to injection into the engine. This is because turbochargers operate at relatively high temperatures and cooling additionally provides a higher intake air density.

As the turbocharger lubricating oil is pressurised it is generally restricted before the turbocharger lubricating oil inlet by placing a small restrictor device (known as restrictor pills) into the lubricating oil feedline so as to limit the oil pressure acting within the CHRA. However, if excess pressure is built up in the turbocharger CHRA there is the possibility for lubricating oil ingress into the turbine or compressor stages of the turbocharger disadvantageously causing oil contamination of the gasses. This not only detracts from the turbocharger performance but may have other deleterious effects on the engine.

Genesis of the Invention

The genesis of the present invention is a desire to provide a turbocharger lubricating oil pressure regulator that overcomes the disadvantage of the prior art, or to provide a useful alternative.

SUMMARY OF THE INVENTION

In accordance with an aspect of the present invention there is disclosed a turbocharger lubricating oil pressure regulator comprising:
    a lubricating oil inlet port adapted to receive turbocharged lubricating oil;
    a lubricating oil outlet port in fluid communication with the lubricating oil inlet port;
    lubricating oil bypass port in fluid communication with the oil inlet port at one end and in fluid communication with a lubricating oil sump at another; and
    a valve biased in a closed configuration to block oil flow between the lubricating oil inlet port and the bypass port and movable toward an open configuration in response to a predetermined lubricating oil pressure at the inlet port allowing lubricating oil to flow through the bypass port to the oil sump.

It can therefore be seen that there is advantageously provided significant oil pressure supply inhibition regardless of engine oil pressure targets effectively eliminating the excess pressure build up due to corresponding excess engine oil pressure delivery. Furthermore, preferred embodiments of the invention do not require tuning or experimental procedures for the size of the restrictor nipple which is affected by oil viscosity as the lubricating oil pressure regulator is pressure sensitive and self-regulating.

BRIEF DESCRIPTION OF THE DRAWINGS

A preferred embodiment of the invention will now be described, by way of example only, with reference to the accompanying drawings in which.

DETAILED DESCRIPTION

Figure 1:
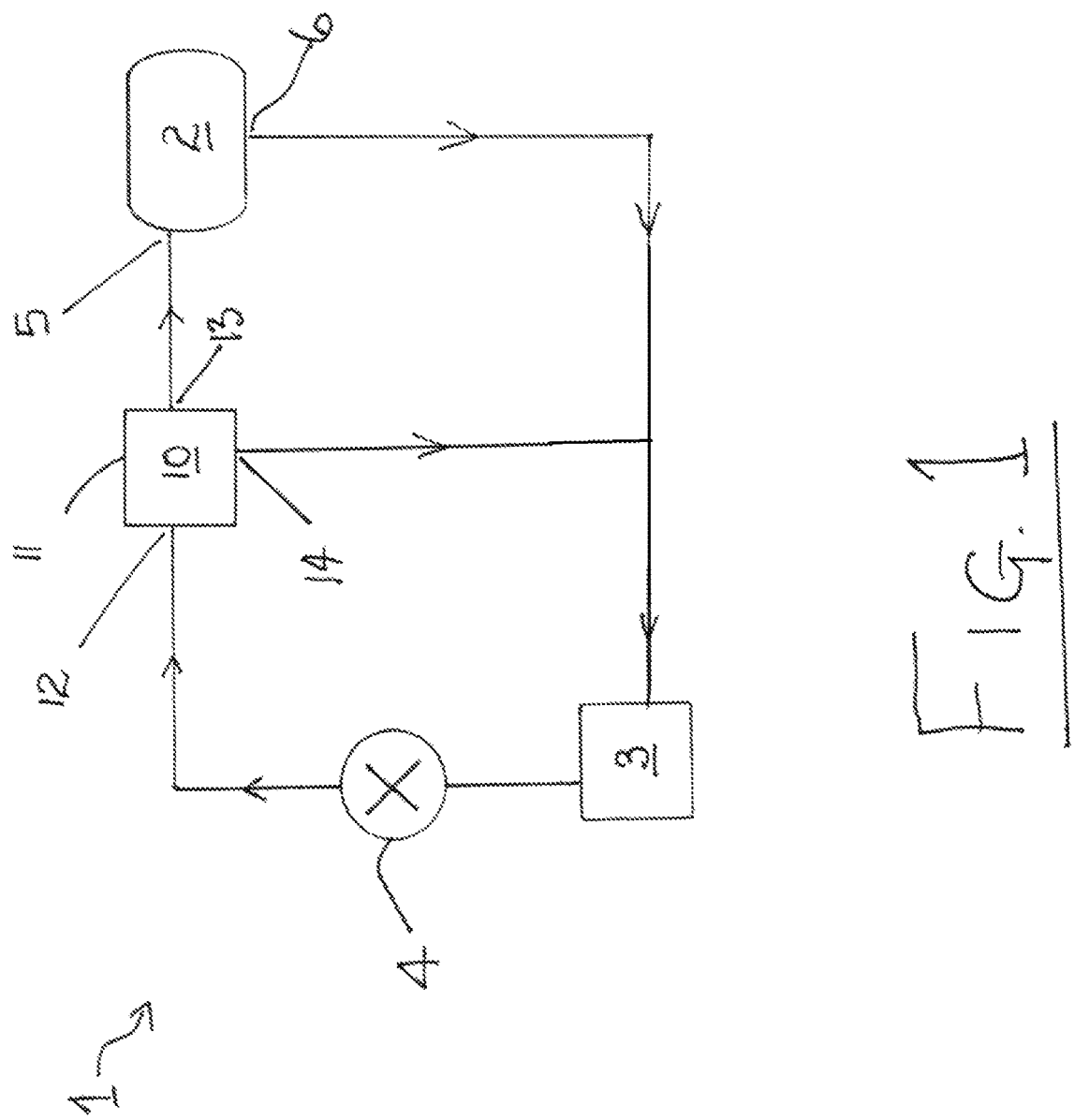
FIG. 1 is a schematic view of an oil circuit for a turbocharged, internal combustion engine having a lubrication oil pressure regulator according to a first preferred embodiment.

In the drawings of the preferred embodiments, it will be appreciated that like reference numerals have been used to denote like components unless expressly noted otherwise. FIG. 1 shows an oil circuit for an internal combustion engine (not illustrated) that includes turbocharger 2 and has an oil pressure regulator 10 according to the preferred embodiment. The particulars of the internal combustion engine are not shown other than for illustrated the oil circuit 1 operation. It will be appreciated that the air compression function of the turbocharger 2 can be any conventional and need not be shown.

In the oil circuit 1, the path of lubricating oil therefor is illustrated. An oil sump 3 is traditionally employed to store oil that is pumped via an oil pump 4 of the internal combustion engine to a turbo charger lubrication oil inlet 5 for lubricating the turbocharger centre housing rotating assembly. Lubricating with oil is pumped by the oil pump 4 from the sump 3 through the lubricating oil inlet 5 and out through the turbocharger lubricating oil outlet 6.

In the preferred embodiment, the engine lubricating is not cooled. However, in other preferred embodiments, not illustrated, a conventional air cooled radiator or other conventional cooling means can be employed either before or after being returned to the sump 3 for recirculation.

Intermediate the oil pump 4 and the turbocharger lubricating oil inlet 5 is oil pressure regulator 10 according to the first preferred embodiment. The oil pressure regulator 10 includes a housing 11 together with a lubricating oil inlet port 12 and a corresponding lubricating oil outlet port 13. In inlet port 12 and outlet port 13 are in fluid communication with each other and intermediate inlet port 12 and outlet port 13 lubricating oil bypass port 14 is provided. The bypass port 14 is valved by a valve 17 that is movable to allow lubricating oil to flow from the inlet port 12 through the bypass port 14 in response to oil pressure at the inlet port 12 exceeding a predetermined amount.

That is, lubricating oil is permitted to flow not only to lubricating oil inlet 5 of the turbocharger but excess pressure is bled via the bypass 14 as the pressure exceeds by a predetermined value. The lubricating oil from bypass 14 shown in FIG. 1 recirculates with oil exiting from the turbocharger lubricating oil outlet 6. However, it will be appreciated that lubricating oil from the bypass port 14 can be fed directly back into the sump 3.

In this way, significant oil pressure oversupply is inhibited by using the oil pressure regulator 10 feeding the turbocharger CHRA. This also prevents any surge in turbocharger oil pressure subsequent to an corresponding of the oil at inlet 12. This is independent of any engine oil pressure targets related to the operation of the internal combustion engine and significantly minimises any possibility of excess pressure build up due to excess engine oil pressure delivery. This correspondingly prevents the possibility of oil ingress into the turbine or compressor stage of the turbocharger (not illustrated) to cause oil contamination of the gasses.

Figure 2:
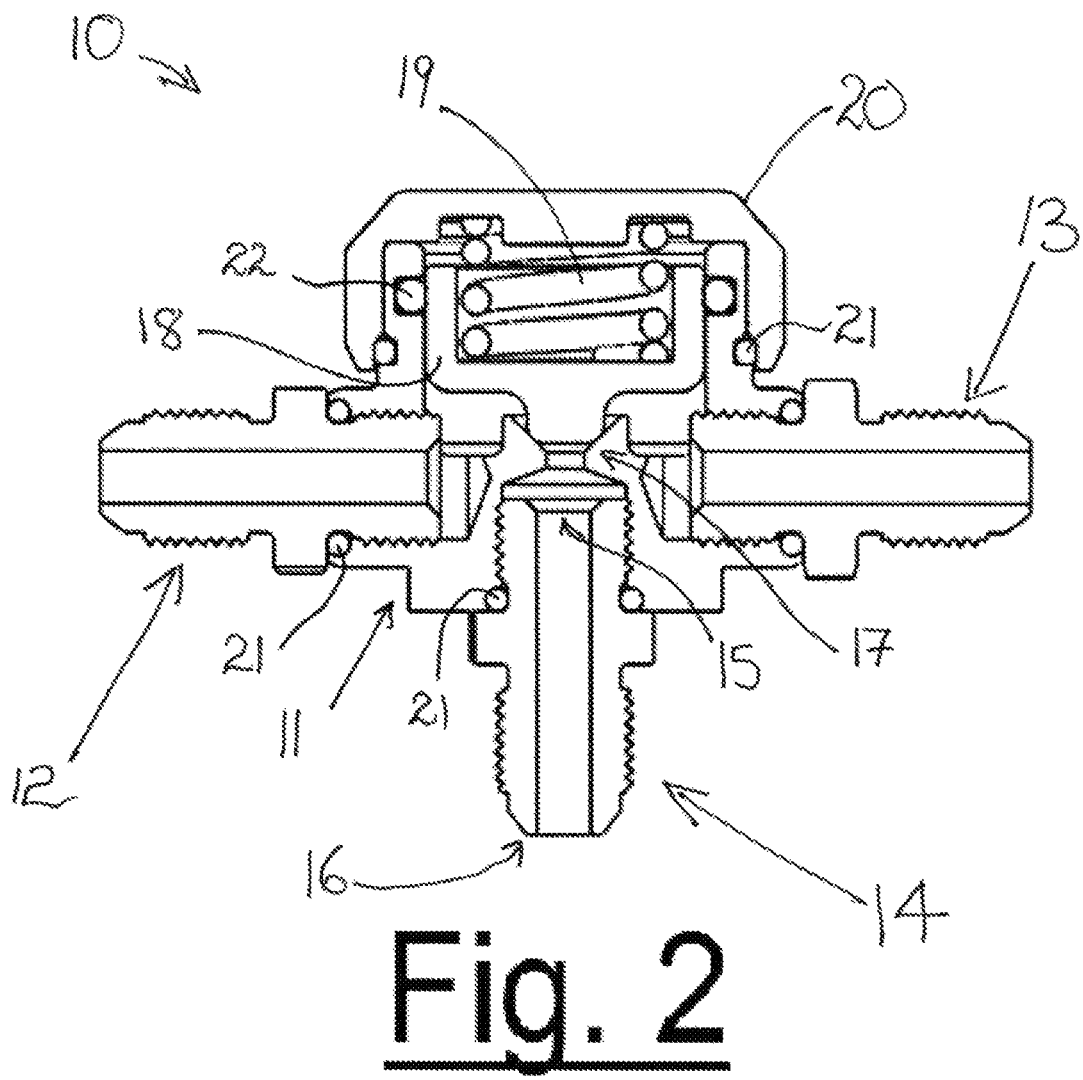
FIG. 2 is a cutaway side view of a turbocharger lubricating oil pressure regulator of FIG. 1.

FIG. 2 shows a cutaway side view of the oil pressure regulator 10 of the first preferred embodiment. In FIG. 2, the regulator 10 is in a closed position whereby turbocharger lubricating oil entering inlet port 12 flows through to outlet port 13 without any oil flowing through bypass port 14.

In the regulator 10, the bypass post 14 includes an entry 15 and an exit 16. The exit 16 bleeds oil to sump 3. A compression spring 19 biases a piston 18 which causes it to close the bypass port 14 at the inlet 15. Cap 20 is provided to retain the compression spring 19 distal the piston 18. A piston seal 22 seals intermediate the housing 11 and the piston 18 and secondary seals 21 seal intermediate the cap 20 and the housing 11.

When turbocharger lubricating oil enters the regulator inlet port 12 it flows through the outlet port 13 to the turbocharger lubricating oil inlet 5. If the pressure of the inlet port 12 exceeds a predetermined amount piston 18 is moved against the bias of compression spring 19 to allow lubricating oil to flow through the inlet 15 of the bypass port 14 thereby bleeding lubricating oil and reducing overpressure of the lubricating oil at the inlet port 12 lubricating oil still flows through outlet port 13 to inlet 5 of the turbocharger.

In use, lubricating oil pressure at the inlet port 12 exceeding a predetermined pressure causes the piston 18 to move and allow lubricating oil to flow through bypass port 14 so as to prevent overpressure in the regulator outlet port 13 from entering the turbocharger lubricating oil inlet 5. The lighter the pressure at inlet port 12, the more the piston 18 moves clear of inlet 15 of bypass port 14.

Although not illustrated in the drawings, it will be appreciated that the cap 20 retaining the compression spring 19 can be adjustable in direction of the longitudinal axis of the compression spring 19, for example, by threaded engagement with housing 11. This will allow the pressure at which the piston 18 is moved clear of the inlet 15 of the bypass port 14 to be varied if desired. It will be appreciated that in the embodiment of FIG. 2 the regulator 10 will effectively open valve 17 formed by the compression spring 19 and piston 18 continuously away from inlet 15 of the bypass 14 as the pressure increases at the regulator inlet port 12. In this way, the piston 18 can move between a totally closed position as shown in FIG. 2 to a fully open position (not illustrated) in which minimum inhibition of the flow lubricating oil through the bypass port 14 is provided.

It will be appreciated that any preferred methods can be employed such as use of turnable compression springs or other conventional techniques to vary the bias of the compression spring 19 to tune the pressure at the inlet port 12 which moves the piston 18 from the closed position. Of course, this can be fixed as mentioned above so that in use, experimental determination will not be required for the size of any restrictor nipple or oil viscosity changes as it is purely pressure sensitive.

Figure 3:
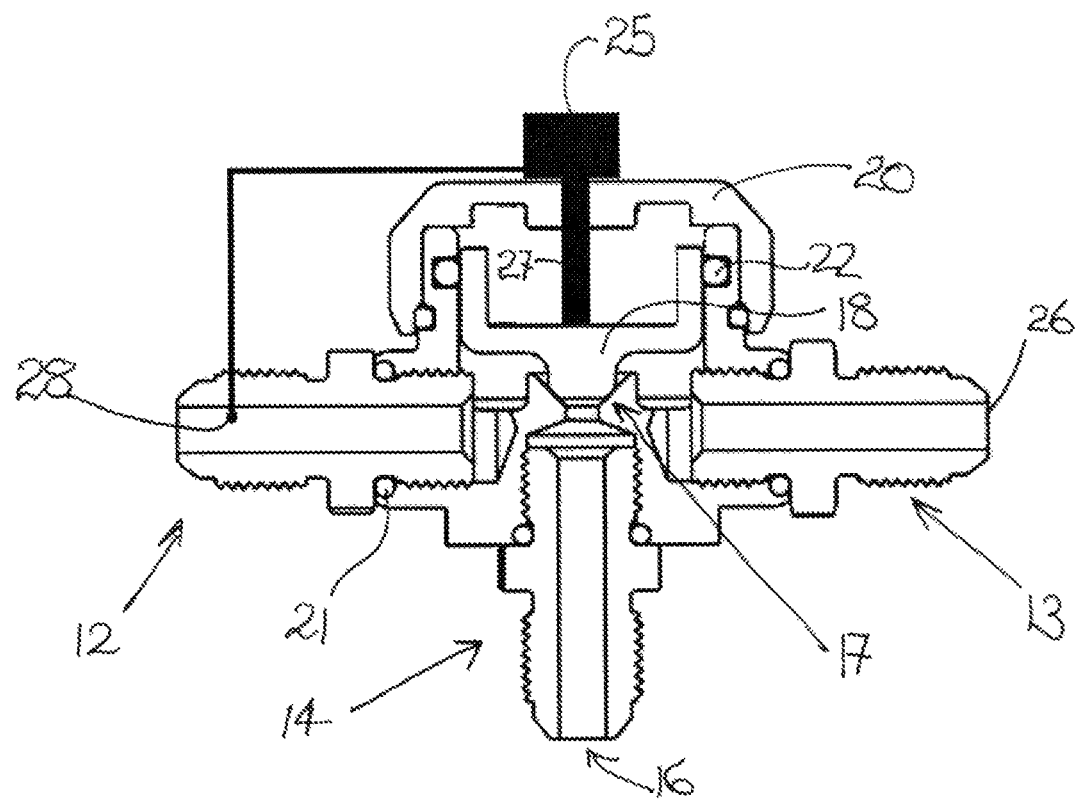
FIG. 3 is a cutaway side view of turbocharger lubricating oil pressure regulator according to another preferred embodiment.

Referring now to FIG. 3, there is shown a schematic diagram of another preferred embodiment of the regulator 10. In this embodiment, the compression spring 19 of the first preferred embodiment in the closed position is replaced by an electrical driven solenoid 25 with a longitudinally movable shaft 27 mounted to the piston 18 so as to control its movement to and fro. A pressure sensor 28 is disposed at or adjacent regulator inlet port 12 to since the lubricating oil pressure. If the pressure exceeds a predetermined amount, the piston 18 is moved by the solenoid 25 clear of the inlet 15 of the bypass port 14. This is essentially an electronic implementation of the mechanical implementation in the first preferred embodiment of the invention and may operate independently of both the engine and the turbocharger.

It will be appreciated also that any preferred type of valve mechanism 17 can be included in regulator 10. For example, the piston 18 may substituted by a diaphragm (not illustrated) in a normally closed position and closing bypass port 14 from inlet port 12, where a predetermined pressure causes the membrane to move clear of bypass port 14 and divert over-pressurised oil from inlet 12.

Whilst the preferred embodiment of the oil circuit of FIG. 1 indicates the regulator 10 is spaced apart from the turbocharger 2, it will be appreciated that regulator 10 may be integrated into the housing or centre housing of the turbocharger or that distal end 26 of the lubricating oil outlet port 13 connected directly to the turbocharger centre housing (not illustrated).

Figure 4:
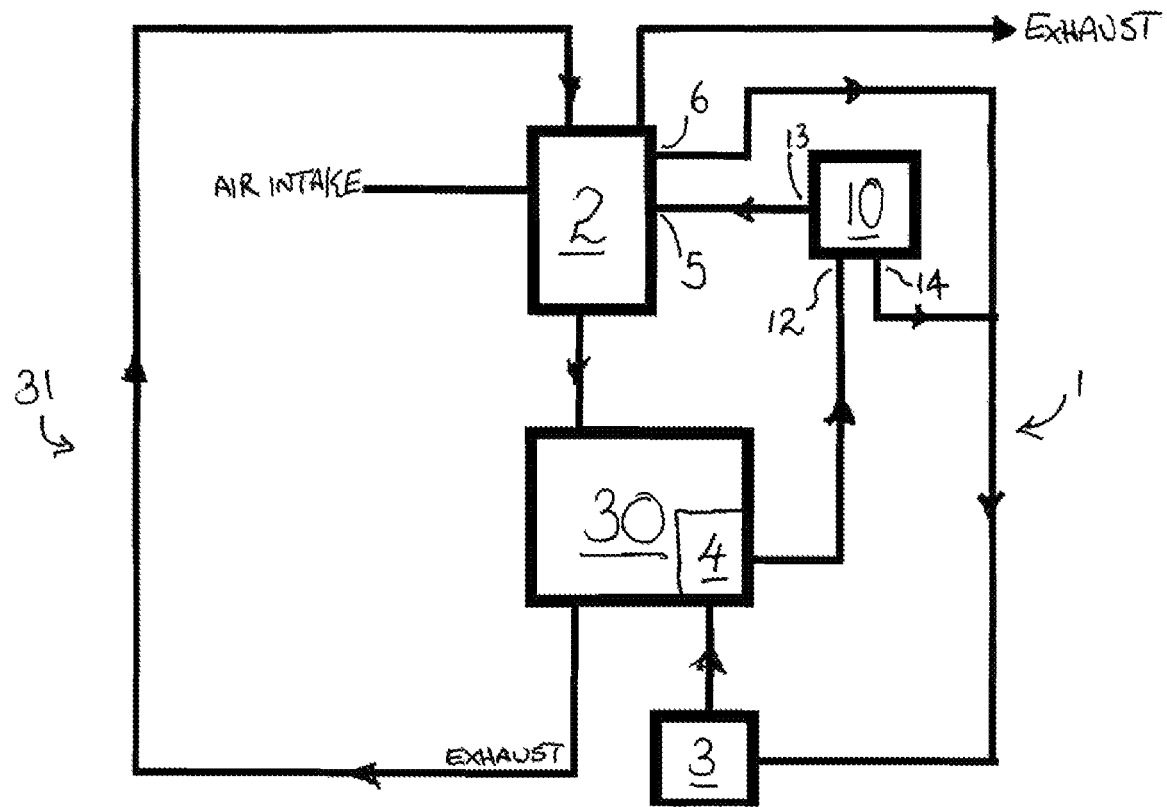
FIG. 4 is a block diagram of an internal combustion or compression engine having the oil pressure regulator of FIG. 2 or FIG. 3.

FIG. 4 is a block diagram showing an internal combustion engine 30 having turbocharger 2, however, this may be a compression engine such as diesel fuelled. The air and oil circuits 31 and 1 respectively are shown, together with the regulator 10. Engine oil sump 3 and the engine oil pump 4 are also shown.

The foregoing describes only one embodiment of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A turbocharged engine comprising:
   an internal combustion engine;
   a turbocharger configured to provide compressed air to the engine;
   an oil pump mechanically driven by the engine configured to provide oil to the turbocharger from an oil sump;
   an oil pressure regulator disposed intermediate the oil pump and a turbocharger lubricating oil inlet, the regulator comprising:
   a lubricating oil inlet port adapted to receive turbocharger lubricating oil from the oil sump via the internal combustion engine powered oil pump;
   a lubricating oil outlet port in fluid communication with the turbocharger lubricating oil inlet port;
   a lubricating oil bypass in fluid communication with the lubricating oil inlet port at one end and in fluid communication with the lubricating oil sump at another; and
   a valve disposed intermediate the lubricating oil inlet port and the lubricating oil bypass, the valve biased in a closed configuration to block oil flow between the lubricating oil inlet and the bypass and movable toward an open configuration in response to a predetermined lubricating oil pressure at the lubricating oil inlet port allowing lubricating oil to flow through the lubricating oil bypass to the oil sump.

2. The turbocharged engine as claimed in claim 1, wherein the valve includes a solenoid driven piston and a lubricating oil pressure sensor disposed at the lubricating oil inlet port, the solenoid driving the piston in response to signals from the sensor indicative of the predetermined oil inlet port pressure being exceeded.

3. The turbocharged engine as claimed in claim 1, wherein the valve includes a compression spring driven piston covering the lubricating oil bypass in the closed configuration and movable away therefrom.

4. The turbocharged engine as claimed in claim 3 wherein the compression spring is able to be tuned to vary the pressure at which the piston moves from the closed configuration.

5. The turbocharged engine as claimed in claim 3, wherein the piston is variably movable between the closed configuration and open configuration whereby maximum lubricating oil flow from the lubricating oil inlet port through the bypass is provided.

6. The turbocharged engine as claimed in claim 5, wherein the compression spring is able to be tuned to vary the pressure at which the piston moves from the closed configuration.

* * * * *